(12) United States Patent
Czaja et al.

(10) Patent No.: US 9,944,260 B2
(45) Date of Patent: Apr. 17, 2018

(54) METHOD OF CONTROLLING AN ELECTRONIC BRAKING SYSTEM

(71) Applicant: WABCO GmbH, Hannover (DE)

(72) Inventors: Daniel Czaja, Hannover (DE); Hauke Diers, Lehrte (DE); Axel Stender, Hameln (DE); Markus Wolf, Hildesheim (DE)

(73) Assignee: WABCO GmbH, Hannover (DE)

( * ) Notice: Subject to any disclaimer, the term of this patent is extended or adjusted under 35 U.S.C. 154(b) by 120 days.

(21) Appl. No.: 14/915,669

(22) PCT Filed: Jun. 14, 2014

(86) PCT No.: PCT/EP2014/001621
§ 371 (c)(1),
(2) Date: Mar. 1, 2016

(87) PCT Pub. No.: WO2015/032457
PCT Pub. Date: Mar. 12, 2015

(65) Prior Publication Data
US 2016/0221552 A1   Aug. 4, 2016

(30) Foreign Application Priority Data
Sep. 4, 2013 (DE) .................. 10 2013 014 672

(51) Int. Cl.
*B60T 8/17*   (2006.01)
*B60T 8/172*   (2006.01)
*B60T 8/171*   (2006.01)
*B60T 8/32*   (2006.01)

(52) U.S. Cl.
CPC ............ *B60T 8/1708* (2013.01); *B60T 8/171* (2013.01); *B60T 8/172* (2013.01); *B60T 8/323* (2013.01); *B60T 2270/413* (2013.01)

(58) Field of Classification Search
CPC ........ B60T 8/1708; B60T 8/172; B60T 8/171; B60T 8/323; B60T 2270/413
See application file for complete search history.

(56) References Cited

U.S. PATENT DOCUMENTS

| 4,926,683 A | 5/1990 | Ishizeki | |
| 6,371,227 B2* | 4/2002 | Bartlett | .............. B60G 17/0523 180/209 |
| 6,663,196 B1* | 12/2003 | Mueller | .................. B60T 8/172 303/144 |

(Continued)

FOREIGN PATENT DOCUMENTS

| DE | 4130848 C1 | 3/1993 |
| DE | 19707210 A1 | 8/1998 |

(Continued)

OTHER PUBLICATIONS

European Patent Office, Rijswijk, Netherlands, International Search Report of International Application No. PCT/EP2014/001621, dated Sep. 10, 2014, 2 pages.

*Primary Examiner* — Russell Frejd
(74) *Attorney, Agent, or Firm* — Brinks Gilson & Lione

(57) ABSTRACT

In a method for controlling an electronic braking system for vehicles, in particular for trailer vehicles, signals of wheel-speed sensors are processed. At least signals of one or more sensors that are not wheel-speed sensors are processed for a detection of motion and/or standstill.

15 Claims, 2 Drawing Sheets

(56) References Cited

U.S. PATENT DOCUMENTS

| | | | |
|---|---|---|---|
| 2002/0095251 A1* | 7/2002 | Oh | B60T 7/20 |
| | | | 701/70 |
| 2006/0204347 A1* | 9/2006 | Waldbauer | B60T 7/20 |
| | | | 410/156 |
| 2010/0066161 A1* | 3/2010 | Fry | B60T 7/20 |
| | | | 303/9.66 |
| 2010/0070149 A1* | 3/2010 | Fry | B60T 8/1708 |
| | | | 701/70 |
| 2010/0141025 A1* | 6/2010 | Brockmann | B60G 17/0523 |
| | | | 303/20 |
| 2011/0006591 A1 | 1/2011 | Yoshii et al. | |
| 2014/0081544 A1* | 3/2014 | Fry | B60T 8/323 |
| | | | 701/70 |
| 2014/0149011 A1* | 5/2014 | Eberling | B60T 8/1708 |
| | | | 701/70 |

FOREIGN PATENT DOCUMENTS

| | | |
|---|---|---|
| DE | 10 2005 025 622 A1 | 10/2006 |
| DE | 10 2007 005 123 A1 | 9/2007 |
| DE | 10 2010 007 468 A1 | 10/2010 |
| GB | 2 497 131 A | 6/2013 |

\* cited by examiner

METHOD OF CONTROLLING AN ELECTRONIC BRAKING SYSTEM

TECHNICAL FIELD

The present application relates to a method for controlling an electronic braking system. In addition, the invention relates to a control unit and an electronic braking system.

BACKGROUND

Modern commercial vehicles with pneumatic brakes exhibit, in addition, an electronic braking system which, among other things, has an anti-lock function. An electronic brake control unit (EBS ECU) processes signals of wheel-speed sensors and, where appropriate, intervenes in the actuation of the brakes.

The electronic braking system performs further functions. For this purpose the signals of further sensors may be evaluated. The further sensors may have been integrated into the brake control unit, may have been directly linked to the brake control unit via lines, or signals of further sensors may be communicated to the brake control unit via a data-bus system, for instance a CAN data bus. A lateral-acceleration sensor has preferentially been integrated into the brake control unit. In the case of pneumatically suspended vehicles, a bellows-pressure sensor registers the level of the loading or axle load. In the case of mechanically suspended vehicles, spring-deflection sensors may have been provided for the same purpose.

Trailer vehicles may have been equipped with their own electronic braking system and/or with a brake control unit. The electronic braking system of the trailer vehicle has been connected to the corresponding system of the towing vehicle via a standardized plug-in connection. A data-bus link may have been integrated into the plug-in connection or may be additionally present. As a result, signals acquired in the towing vehicle can be transferred to the trailer vehicle.

For reasons of safety, if no signals are provided by the wheel-speed sensors after expiration of a definite time-interval after switching on the electronic braking system, an error is presumed and an error message is output. For example, the wheel-speed sensors may be defective, may not have been inserted correctly, or cable links may be defective. In fact, an error does not have to be present in every case. For instance, with the electronic braking system switched on and without the parking-brake engaged, quite long standstill-times may arise, for example in the course of a stay in a workshop, or for other reasons.

If a vehicle has lift axles and the latter are equipped with wheel-speed sensors, the case may arise that the vehicle is in motion, the wheel-speed sensors in question are correctly transmitting no signals, on account of the raised axles, and nevertheless an error message is generated, since signals of the wheel-speed sensors are expected within the defined time-interval.

SUMMARY OF THE INVENTION

It is an object of the present invention to detect motion and/or standstill of the vehicle independently of the signals of the wheel-speed sensors. In particular, error signals are to be avoided if no error is present.

In the method for controlling an electronic braking system for vehicles, in particular for trailer vehicles, according to the present application, signals of wheel-speed sensors are processed. For the detection of motion and/or standstill, however, at least signals of one or more sensors that are not wheel-speed sensors are processed. It is preferentially a question of sensors that are, in any case, integral parts of typical electronic braking systems. In addition, the signals of the wheel-speed sensors may also be drawn upon.

In accordance with the invention, the signals of the sensors that are not wheel-speed sensors can be processed in order to verify signals of the wheel-speed sensors or to verify error messages derived therefrom. This means, in particular, that the signals of the further sensors (which are not wheel-speed sensors) are able to influence or block error messages on account of absent signals of the wheel-speed sensors.

According to a further idea of the invention, signals of one or more loading sensors, in particular of at least one bellows-pressure sensor and/or of at least one displacement sensor, can be processed for the detection of motion and/or standstill. Bellows-pressure sensors detect the axle load in the case of pneumatic suspension, whereas displacement sensors pick up the spring deflection of a mechanical suspension and in this way detect loading and/or axle load. Use may also be made of the displacement sensors of electronically controlled air-suspension systems for the purpose of detection.

In the case of a traveling vehicle the loading sensors generate a signal with distinctly higher amplitude than in the case of a stationary vehicle. Correspondingly, from the signals it can be detected whether the vehicle is in motion or is stationary. In the case of raised lift axles, no loading or axle load is indicated any longer. There is a clear offset in comparison with the signal of an unraised lift axle. If no loading or axle load is indicated, an error message on account of absent signals of the wheel-speed sensors can therefore be corrected or suppressed.

According to a further idea of the invention, there is provision that signals of one or more acceleration sensors, in particular of a lateral-acceleration sensor, are processed for the detection of motion and/or standstill. In modern brake control units for electronic braking systems a lateral-acceleration sensor is already present. The signal needs only to be evaluated for the stated object. Also possible is the use of the signals of acceleration sensors in the direction of other axles, for instance for motions along a longitudinal axis or vertical axis of the vehicle. Characteristically different or higher acceleration values typically arise in the case of a vehicle in motion than in the case of a stationary vehicle.

In accordance with the invention, signals of one or more brake-pressure sensors can also be processed for the detection of motion and/or standstill. If, for example, the brake pressure is not higher than a feed pressure, in principle a standstill will be assumed.

According to a further idea of the invention, signals that are supplied to the vehicle via an interface of a linked vehicle can be processed for the detection of motion and/or standstill. In this way, a trailer vehicle with electronic braking system receives information about the speed of the towing vehicle via a standardized interface, and can process these signals in its own brake control unit.

Advantageously, the amplitude and/or frequency of signals of the sensors that is not wheel-speed sensors is/are evaluated. The amplitude and frequency at standstill of the vehicle are known or can be easily ascertained for each type of vehicle. Deviations therefrom point to a state of motion of the vehicle.

Within the scope of the invention there may be provision that the vehicle is a trailer vehicle in which all the axles are liftable. A trailer vehicle of such a type is typically used with a rigidly linked following trailer vehicle. Both trailer vehicles have their own electronic braking system with brake control unit and wheel-speed sensors.

Also a subject of the invention is a control unit for an electronic braking system, with inputs or interfaces for signals of wheel-speed sensors and with inputs or interfaces for signals of further sensors, for implementing the method according to the invention.

Likewise a subject of the invention is an electronic braking system for a vehicle, in particular for a trailer vehicle, with a control unit, with wheel-speed sensors and with further sensors, wherein signals of the wheel-speed sensors are processed and wherein at least signals of one or more sensors that are not wheel-speed sensors are processed for a detection of motion and/or standstill.

The preferred application of the invention is an electronic braking system in a vehicle that exhibits, in addition to this, a pneumatic, hydraulic or other braking system.

Further features, details, and benefits of the claimed invention are provided in the following description and in the drawings.

Advantageous embodiments of the invention will be elucidated in the following on the basis of drawings. The drawings are provided for purely illustrative purposes and are not intended to limit the scope of the invention.

DETAILED DESCRIPTION OF THE DRAWINGS

Figure 1:
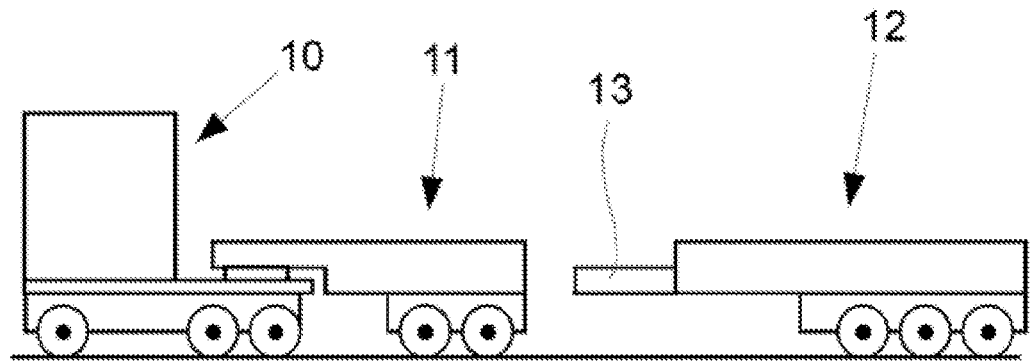
FIGS. 1, 2 and 3 show a tractor with a separable semi-trailer.
Figure 2:
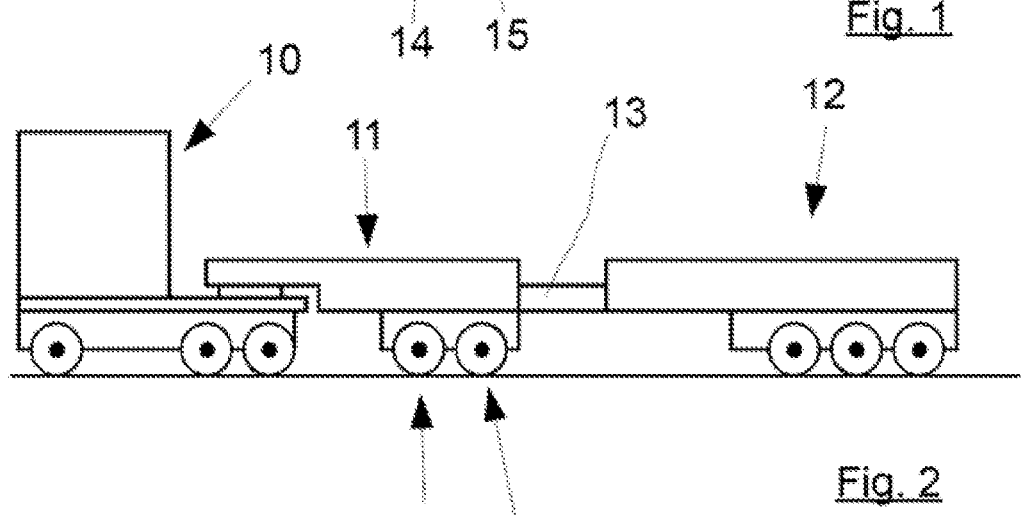
Figure 3:
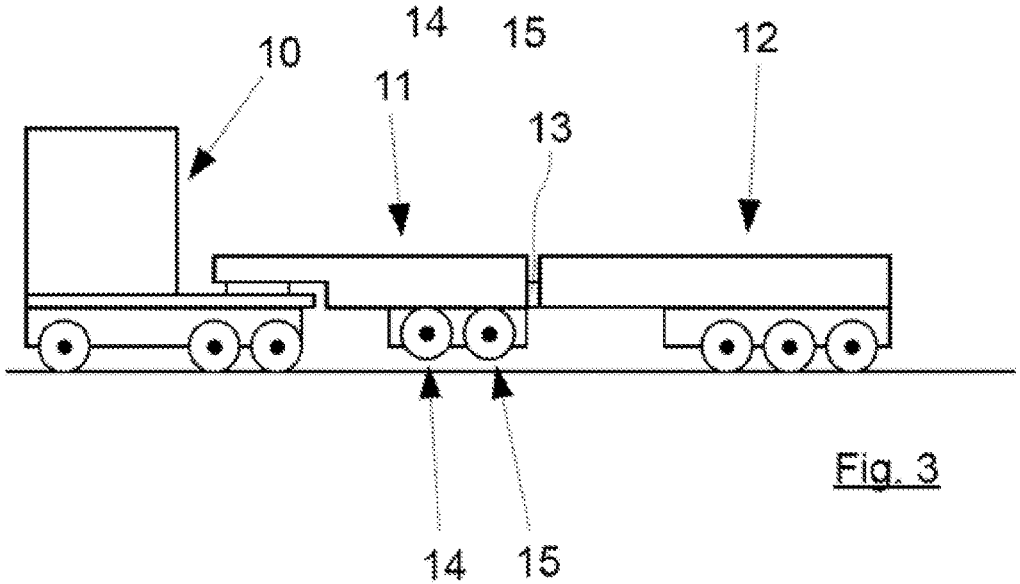

Discernible in FIG. 1 is a tractor-trailer unit with a tractor 10, with a front trailer part 11 and with a rear trailer part 12. The front trailer part 11 takes the form of a semitrailer. The rear trailer part 12 is capable of being rigidly linked to the front trailer part 11; see FIG. 3. For this purpose a rigid drawbar 13 of the rear trailer part 12 is inserted into an appropriate receptacle of the front trailer part 11; see sequence of FIGS. 1, 2 and 3. This type of a separable semitrailer is also designated as a combitrailer.

Typically, each of the two trailer parts 11, 12 has been dimensioned in such a way that in each instance a 20-foot container can be accommodated. When the trailer parts are put together to form the combitrailer, a 40-foot container can be accommodated. The front trailer part 11 has one or two lift axles 14, 15 which have been lifted in the case of an unladen combitrailer. Wheels of the lift axles 14, 15 then have no ground contact.

Figure 4:
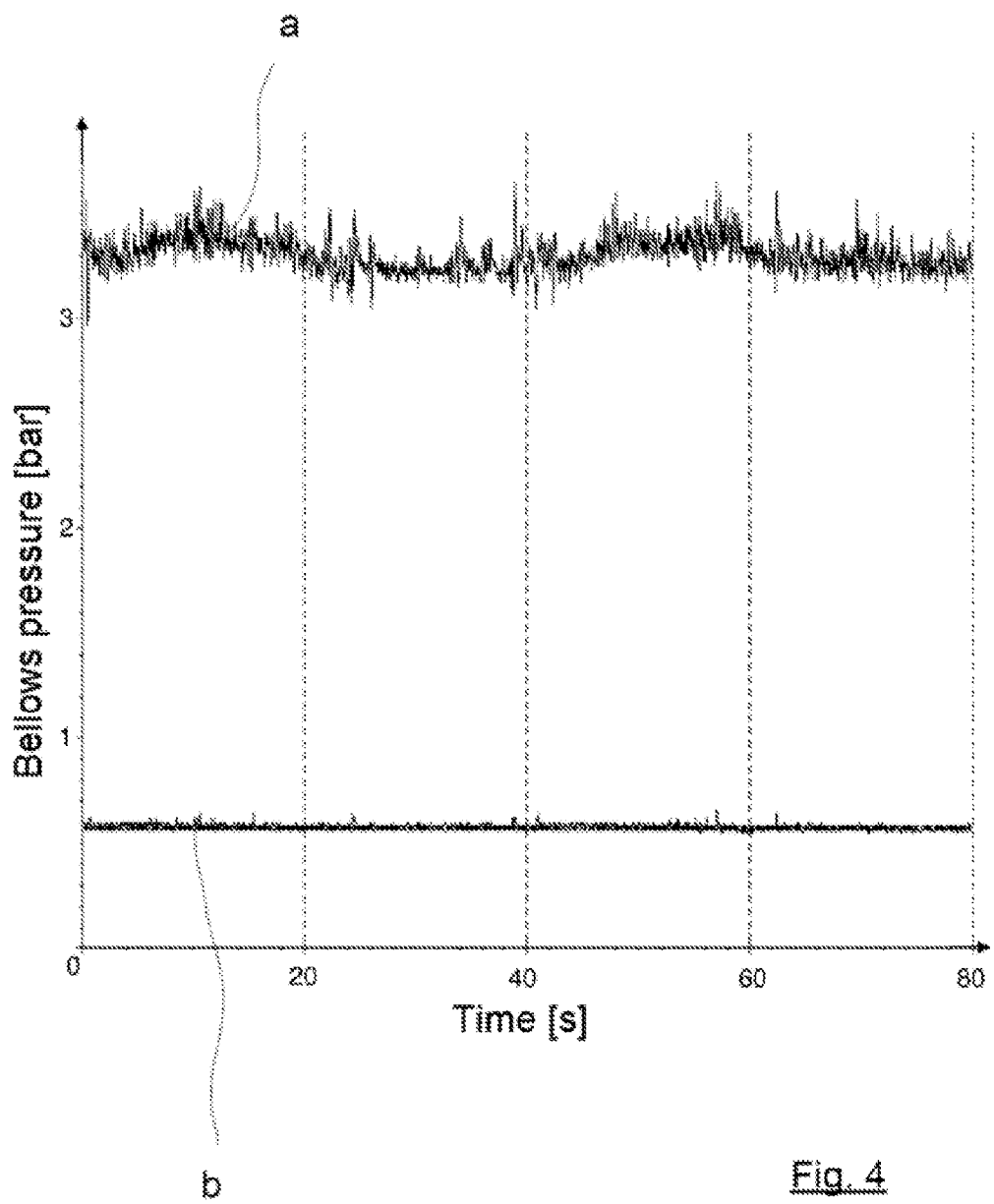
FIG. 4 shows the printout of signals of a bellows-pressure sensor in a trailer vehicle with electronic braking system and pneumatic suspension, in particular in the front vehicle part of the semitrailer shown in FIGS. 1 to 3.

The two trailer parts 11, 12 are each equipped with their own electronic braking system. The latter exhibits in each instance a control unit which processes signals of coupled wheel-speed sensors and bellows-pressure sensors. FIG. 4 shows exemplary curves a and b for the bellows pressure of the front trailer part 11.

Bellows-pressure curve a is an example of the bellows pressure in the case of lowered lift axles 14, 15. An offset of about 3.3 bar (overpressure) can be discerned, with fluctuations of the amplitude from 3 bar to 3.7 bar.

Bellows-pressure curve b arises in the case of lifted axles 14, 15. The bellows pressure amounts to about 0.6 bar with only slight fluctuations up to at most 0.7 bar.

The electronic braking system of trailer vehicles typically tests the functioning of the wheel-speed sensors. After the electronic braking system has been switched on, at the latest when starting an attached towing vehicle, speed signals of the wheel-speed sensors are expected by the control unit. If the signals fail to appear, a fault message is communicated to the driver after expiration of a definite time (for example, 30 minutes). It will then be assumed that the wheel-speed sensors have failed, are not working, or have not been coupled properly.

In the case of lifted axles 14, 15 of the front trailer part 11, the described fault message is generated by the control unit after expiration of the definite time. In order to avoid this, the signals of the bellows-pressure sensor are evaluated jointly. Bellows-pressure curve b is detected. The bellows pressure lies below a previously defined limiting value of, for example, 1 bar and exhibits only very slight fluctuations. Lifted axles will therefore be assumed, and the fault message will be suppressed.

In the case of lowered lift axles 14, 15 of the front vehicle part 11, the control unit detects a state of motion on the basis of bellows-pressure curve a and the associated level and fluctuation of the amplitude of the bellows pressure. If the wheel-speed sensors are providing no signals, an error is present and a fault message is output.

In another case, the stating-point is a trailer vehicle which is not shown, for instance a multi-axle trailer with drawbar and fifth wheel. The trailer vehicle is located in a workshop for testing. The electronic braking system has been switched on, the wheel-speed sensors have been coupled properly and are not providing a speed signal, since the vehicle is stationary. A parking-brake has not been actuated. The bellows-pressure sensor provides a signal with high amplitude, analogous to curve a, but with slighter amplitude variation. The control unit of the electronic braking system detects the standstill of the vehicle from the slight variation in amplitude. Correspondingly, no fault message relating to the behavior of the wheel-speed sensors is output.

Alternatively or additionally, signals of further sensors may be drawn upon in the stated examples for the purpose of assessing standstill or motion. The amplitudes of the signals of acceleration sensors vary distinctly more considerably in motion than in the case of standstill of the vehicle. Fluctuating brake pressures may likewise point to a state of motion, as may signals transmitted from the tractor to the trailer vehicle, such as speed or signals of the aforementioned sensors, to the extent that these are also present on the towing vehicle.

While the above description constitutes the preferred embodiments of the present invention, it will be appreciated that the invention is susceptible to modification, variation and change without departing from the proper scope and fair meaning of the accompanying claims.

The invention claimed is:
1. A method for controlling an electronic braking system for vehicles, wherein signals of wheel-speed sensors are processed, the method comprising the further step of processing signals of one or more sensors other than the wheel-speed sensors for a detection of at least one of a motion and a standstill,
wherein the vehicle is a trailer vehicle with a plurality of lift axles configured to be load-dependently lifted and lowered relative to other axles in front of and behind the lift axles, wherein a frequency of the signals of the one or more sensors other than the wheel-speed sensors is evaluated.

2. The method as claimed in claim 1, wherein the signals of the sensors other than the wheel-speed sensors are processed in order to verify signals of the wheel-speed sensors or to verify error messages derived therefrom.

3. The method as claimed in claim 1, wherein the signals of the one or more sensors other than the wheel-speed sensors are signals of one or more loading sensors.

4. The method as claimed in claim 1, wherein the signals of the one or more sensors other than the wheel-speed sensors are signals of one or more acceleration sensors, in particular of a lateral-acceleration sensor.

5. The method as claimed in claim 1, wherein the signals of the one or more sensors other than the wheel-speed sensors are signals of one or more brake-pressure sensors.

6. The method as claimed in claim 1, wherein the signals of the one or more sensors other than the wheel-speed sensors are signals that are supplied to the vehicle via an interface of a linked vehicle.

7. The method as claimed in claim 1, wherein an amplitude of the signals of the one or more sensors other than the wheel-speed sensors is evaluated.

8. The method as claimed in claim 1, wherein the signals of the one or more sensors other than the wheel-speed sensors are signals from at least one bellows-pressure sensor.

9. The method as claimed in claim 1, wherein the signals of the one or more sensors other than the wheel-speed sensors are signals from at least one bellows displacement sensor.

10. A control unit for an electronic braking system, with inputs or interfaces for signals of wheel-speed sensors, the control unit comprising inputs or interfaces for signals of further sensors other than the wheel speed sensors, the control unit configured for processing the signals of the further sensors other than wheel-speed sensors for a detection of at least one of a motion and a standstill, the control unit configured for a trailer vehicle with a plurality of lift axles configured to be load-dependently lifted and lowered relative to other axles in front of and behind the lift axles, wherein a frequency of the signals of the sensors other than the wheel-speed sensors is evaluated.

11. An electronic braking system for a vehicle, comprising a control unit as claimed in claim 10.

12. The control unit according to claim 10, wherein the control unit is configured for processing the signals of the sensors other than the wheel-speed sensors to verify signals of the wheel-speed sensors or to verify error messages derived therefrom.

13. The control unit as claimed in claim 10, wherein the signals of the sensors other than the wheel-speed sensors are signals from one or more loading sensors.

14. The control unit as claimed in claim 10, wherein the signals of the sensors other than the wheel-speed sensors are signals from at least one bellows-pressure sensor.

15. The control unit as claimed in claim 10, wherein the signals of the sensors other than the wheel-speed sensors are signals from at least one bellows displacement sensor.

* * * * *